2,983,755
Patented May 9, 1961

2,983,755

PROCESS FOR THE PREPARATION OF 1-(p-NITRO-PHENYL)-2-ACYLAMIDO-PROPANE-1,3-DIOLS

János Kollonitsch, Budapest, Oszkár Fuchs, Dunakeszi, and Gyula Vita, Budapest, Hungary, assignors to Chinoin Gyógyszer és Vegyészeti Termékek Gyára, Budapest, Hungary No Drawing. Filed May 17, 1956, Ser. No. 585,911

Claims priority, application Hungary May 17, 1955

2 Claims. (Cl. 260—562)

The present invention relates to a process for the preparation of 1-(p-nitrophenyl)-2-acylamidopropane-1,3-diols having the general formula

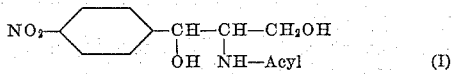

where acyl is for example an acetyl, dichloracetyl or benzoyl residue.

These compounds are useful as therapeutic agents or as intermediates for the preparation of compounds having therapeutic value.

According to the present invention, compounds of the above formula are prepared by reducing compounds having the formula

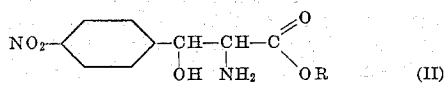

where R is hydrogen or a hydrocarbon residue with complex metalhydrides, treating the resulting metal complex compounds of β-(p-nitrophenyl)-serinols with mild acylating agents and decomposing the metal complex compounds of N-acyl-β-(p-nitrophenyl)-serinols thus obtained by methods known per se.

Compounds of Formula II can exist in diastereoisomeric as well as optical isomeric and racemic forms. The diastereoisomeric forms are herein referred to as the threo and the erythro forms, respectively. The process according to the present invention may be carried out with either of the stereoisomers or with any mixture of stereoisomers.

In carrying out the process according to the invention for example the following compounds may be used as starting materials: threo-β-(p-nitrophenyl)-serine-ethylester, threo-β-(p-nitrophenyl)-serine-methylester, D(—)-threo-β-(p-nitrophenyl)-serine-methylester, D(+)-threo-β-(p-nitrophenyl) - serine-methylester, D(—)-erythro-β-(p - nitrophenyl) - serine-ethylester, L(+)-erythro-β-(p-nitrophenyl)-serine-ethylester. (D resp. L do indicate the configuration of the carbon atom next to the phenyl residue). The corresponding unesterified acids may be used as starting materials as well.

Reduction can be accomplished with several of known complex metal hydrides. For example lithium borohydride and sodium borohydride can be used. Very advantageous reducing agents are the alkaline earth metal borohydrides, for example calcium borohydride. For the reduction of the erythro isomers lithium aluminum hydride may be used too.

According to the invention the reduction is carried out by reacting the starting material to be reduced with the complex metal hydride in a suitable solvent. The choice of the solvent to be employed depends mainly on the complex hydride to be used. For example when using lithium aluminium hydride non-hydroxylic organic solvents are employed, for example diethylether, dioxane, tetrahydrofurane and the like. In the case of calcium borohydride hydroxylic and non-hydroxylic solvents may be used equally, for instance ethanol, tetrahydrofurane and the like. The temperature of the reduction is not particularly critical. However, due to the relative instability of the used complex metal hydride in the solvent employed and from the standpoint of a reasonable time of operation the range of temperature is determined to some extent. For example when lithium aluminium hydride is used in diethyl ether as solvent the reduction is carried out preferably at about 20–40° C. Using calcium borohydride in ethanol as solvent the reduction is performed advantageously at —10 to —20° C.

The required amount of complex metal hydride varies with the starting material from 0.5 to 1.5 mols per 1 mol of the starting material.

After reduction the reaction mixtures contain the metal complexes of the β-(p-nitrophenyl)-serinols. It is known, e.g. from the work of Nystrom & Brown, J. Am. Soc. (1947) 1197, that on reducing esters by means of complex metal hydrides complex metal compounds are obtained as products. These complex compounds do precipitate in certain cases from the reaction mixture. This happens for example when racemic threo-β-(p-nitrophenyl)-serine methylester or the erythro modification is reduced in diethylether with lithium aluminium hydride (e.g. see Example 4 of the German Patent No. 965,582 of Parke, Davis & Comp. concerning "Process for the production of 1-nitrophenyl-2-aminopropane-1,3-diol-derivatives"; and G. Carrara, E. Pace and G. Cristiani, Journ. of the Am. Chem. Soc. 74, 4949 (1952)). In certain other cases the complex compounds do not precipitate from the reduction mixture. This occurs when D(—)-threo-β-(p-nitrophenyl)-serine-methylester is reduced in ethanol by means of calcium borohydride, where the metal complex compound is formed as well, but it remains dissolved and may be obtained from the solution for example after evaporating the solvent.

At the working up of the metal complex compounds of β-(p-nitrophenyl)-serinols for example at their acylation it is of no importance whether they do precipitate or not from the reaction mixture.

The acylation of the complex metal compounds obtained by reduction may be accomplished in various ways, it is only important to carry out the acylation under mild conditions. Acylation is brought about for example with acid halogenides and with esters of halogenated acids. On reacting for example the metal complex compound produced by the reduction of D(—)-threo-(p-nitrophenyl)-serine-methylester by means of calcium borohydride in ethanol with the methylester of dichloro-acetic acid the corresponding metal complex compound of chloramphenicol is obtained in excellent yield.

The N-acyl-p-nitrophenyl-serinols can be obtained in the same way from the N-acylated metal complex compounds resulting by the acylation of the metal complex compounds as according to the literature cited above the not acylated β-(p-nitrophenyl)-serinols are obtained from their metal complexes. The metal complex compounds can be decomposed by treatment with an aqueous mineral acid or with an aqueous alkali.

When the metal complex compound formed by the reduction of D(—)-threo-β-(p-nitrophenyl)-serine-methylester by means of calcium borohydride is boiled for three hours with dichloroacetic acid methylester in ethanol and after evaporation of the resulting mixture to dryness the residual chloramphenicol-metal complex compound is treated with N/10 hydrochloric acid, chloramphenicol is obtained.

It is a special advantage of the present process that the isolation of free β-(p-nitrophenyl)-serinols from the metal complex compounds obtained by reducing compounds having the general Formula II with complex metal hydrides is avoided, a step which is a complicated one and technically difficult to realize, as shown in the literature cited. It is indeed surprising and could not have been predicted that there is no necessity for isolation of the free aminodiols from the metal complex compounds obtained by reduction, but the metal complex compounds can be acylated themselves. Besides the advantage of making superfluous the isolation of the free β-(p-nitrophenyl)-serinols the present invention gives considerably higher yields because it is a simple matter to isolate the N-acylated products from the reaction mixture with a practically quantitative yield.

In order that the invention may be well understood the following examples are given by way of illustration and not of limitation:

Example I

A solution of 0.56 g. of anhydrous calcium chloride in 16 ml. of abs. ethanol is mixed with a solution of 0.38 g. of sodium borohydride in 24 ml. of abs. ethanol at —20° C. and stirred for 10 minutes. To the resulting alcoholic solution of calcium borohydride 2.40 g. of D(—)-threo-β-(p-nitrophenyl)-serine-methylester (M.P. 150–155° C.; $(\alpha)_D = -27°$ in 2% N/1 HCl) suspended in 10 ml. of ethanol are added at about —20° C. while stirring. The reduction is continued by stirring the mixture in a flask fitted with a magnetic stirrer for 4 hours at —20° C., then for further 2 and a half hours at —10° C. and finally by allowing to stand for 18 hours more at —3° C.

The reaction mixture so formed is a colourless solution containing a small amount of a finely divided precipitate. The complex compound of D(—)-threo-1-(p-nitrophenyl)-2-aminopropane-1,3-diol containing calcium and boron is present in the reaction mixture. This compound can be N-dichloroacetylated in the following manner: 2.4 ml. of dichloro-acetic acid methylester are added to the reaction mixture and subsequently the mixture is boiled for 3 hours under reflux. The reaction mixture thus obtained contains the calcium-boron-complex compound of chloramphenicol. From this reaction mixture chloramphenicol can be isolated by evaporating to dryness under reduced pressure, triturating the resulting residue thoroughly with 30 ml. of N/10 hydrochloric acid, filtering the precipitate by suction, washing with water and drying. 3.2 g. of chloramphenicol are obtained, melting at 148–151° C.

If desired, this product can be further purified by recrystallisation from water or ethyl acetate.

Example II 2.4 g. of D(—)-threo-β-(p-nitrophenyl)-serine methylester are converted into chloramphenicol according to the method of Example I, using a complex compound composed of tetrahydrofurane and of calcium borohydride as reducing agent. 3.15 g. of chloramphenicol are obtained. Yield: 97.5 percent.

What we claim is:

1. The process comprising reacting a β-phenyl-serine derivative of the general formula

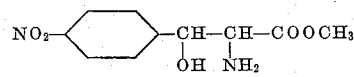

with an alkaline earth metal borohydride at temperatures of —50—+80° C. in a medium selected from the group consisting of a short chain alkanol and tetrahydrofurane, adding dichloroacetic acid methylester under anhydrous conditions to the reaction mixture containing the dissolved metal boro complex compound, then heating the reaction mixture under reflux and evaporating to dryness, so that 1-p-nitrophenyl)-2-dichloroacetyl-amino-propane-1,3-diol is obtained.

2. The process comprising reacting a β-phenyl-serine derivative of the general formula

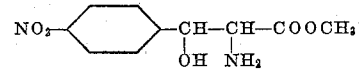

with calcium borohydride at temperatures of —50—+80° C. in a medium selected from the group consisting of a short chain alkanol and tetrahydrofurane, adding dichloroacetic acid methylester under anhydrous conditions to the reaction mixture containing the dissolved metal boro complex compound, then heating the reaction mixture under reflux and evaporating to dryness, so that 1 - (p - nitrophenyl) - 2 - dichloroacetyl - amino - propane-1,3-diol is obtained.

References Cited in the file of this patent

UNITED STATES PATENTS

| | | |
|---|---|---|
| 2,556,868 | Carter et al. | June 12, 1951 |
| 2,839,577 | Kollonitsch et al. | June 13, 1958 |

FOREIGN PATENTS

| | | |
|---|---|---|
| 500,594 | Belgium | Jan. 31, 1951 |
| 506,331 | Belgium | Oct. 31, 1951 |